United States Patent
Gomi et al.

(10) Patent No.: US 7,862,086 B2
(45) Date of Patent: Jan. 4, 2011

(54) TONGUE STORAGE DEVICE AND SEAT BELT APPARATUS HAVING THE SAME

(75) Inventors: Seiji Gomi, Tokyo (JP); Hideki Tomioka, Tokyo (JP); Jae Yoon Jung, Tokyo (JP)

(73) Assignee: Takata Corporation, Tokyo (JP)

( * ) Notice: Subject to any disclaimer, the term of this patent is extended or adjusted under 35 U.S.C. 154(b) by 298 days.

(21) Appl. No.: 12/087,732

(22) PCT Filed: Feb. 6, 2007

(86) PCT No.: PCT/JP2007/052434

§ 371 (c)(1),
(2), (4) Date: Jul. 14, 2008

(87) PCT Pub. No.: WO2007/091698

PCT Pub. Date: Aug. 16, 2007

(65) Prior Publication Data

US 2010/0219625 A1    Sep. 2, 2010

(30) Foreign Application Priority Data

Feb. 6, 2006 (JP) ............................. 2006-028219

(51) Int. Cl.
*B60R 21/00* (2006.01)
(52) U.S. Cl. .................................................. 280/801.1
(58) Field of Classification Search ............. 280/801.1, 280/808; 297/468, 481, 482
See application file for complete search history.

(56) References Cited

U.S. PATENT DOCUMENTS

| | | | | |
|---|---|---|---|---|
| 5,074,590 A | * | 12/1991 | DiPaola | 280/808 |
| 5,421,615 A | * | 6/1995 | Asagiri et al. | 280/808 |
| 5,957,499 A | * | 9/1999 | Kempf | 280/801.1 |
| 6,334,628 B1 | * | 1/2002 | Newball et al. | 280/801.1 |
| 6,412,876 B2 | * | 7/2002 | Nishide | 297/482 |
| 6,854,766 B2 | * | 2/2005 | Kobayashi | 280/801.1 |

FOREIGN PATENT DOCUMENTS

| JP | 2002-331909 | | 11/2002 |
|---|---|---|---|
| JP | 2002331909 A | * | 11/2002 |
| JP | 2002-362308 | | 12/2002 |
| JP | 2005-271675 | | 10/2005 |

\* cited by examiner

*Primary Examiner*—Paul N Dickson
*Assistant Examiner*—Robert A Coker
(74) *Attorney, Agent, or Firm*—Manabu Kanesaka

(57) ABSTRACT

In a tongue storage device according to the present invention, a pickup portion (4c) is picked up and an anchor tongue (5) is then rotated, which causes the anchor tongue (5) to abut on an occupant restraint tongue (6). The tongue (6) is then rotated together with the tongue (5) clockwise with a pivot rib (12f) as a pivot. The rotation of the two tongues (5), (6) is stopped when the tongue (6) abuts on a tongue support portion (12h). Under this condition, a lock tab (5a) of the tongue (5) is inserted through a tongue insertion hole (12g) and locked in tongue lock-and-hold means (13), thereby storing the tongue (5). At this time, the other tongue (6) is stored by being clamped between a seat belt (4) and the pivot rib (12f), and between the tongue (5) and the tongue support portion (12h). A single action for storing the tongue (5) allows both tongues (5), (6) to be stored.

6 Claims, 7 Drawing Sheets

[FIG. 1]
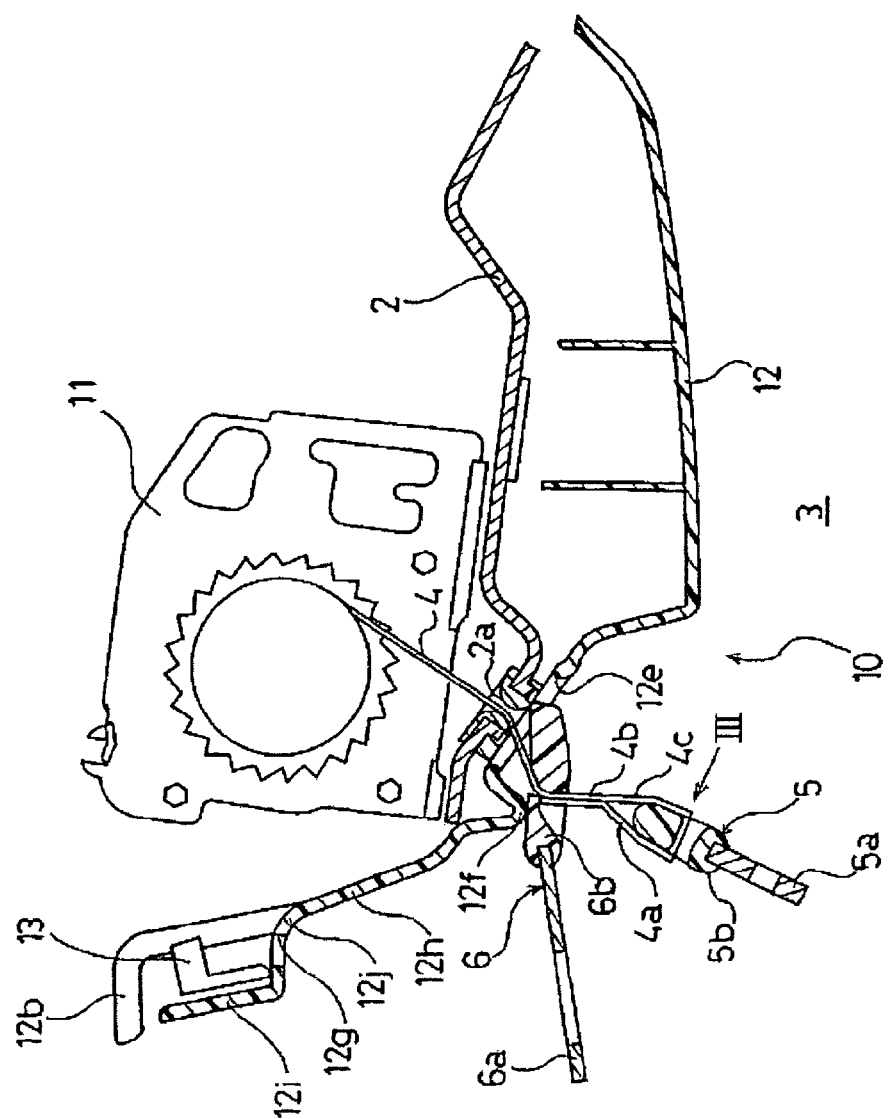

[FIG. 2]
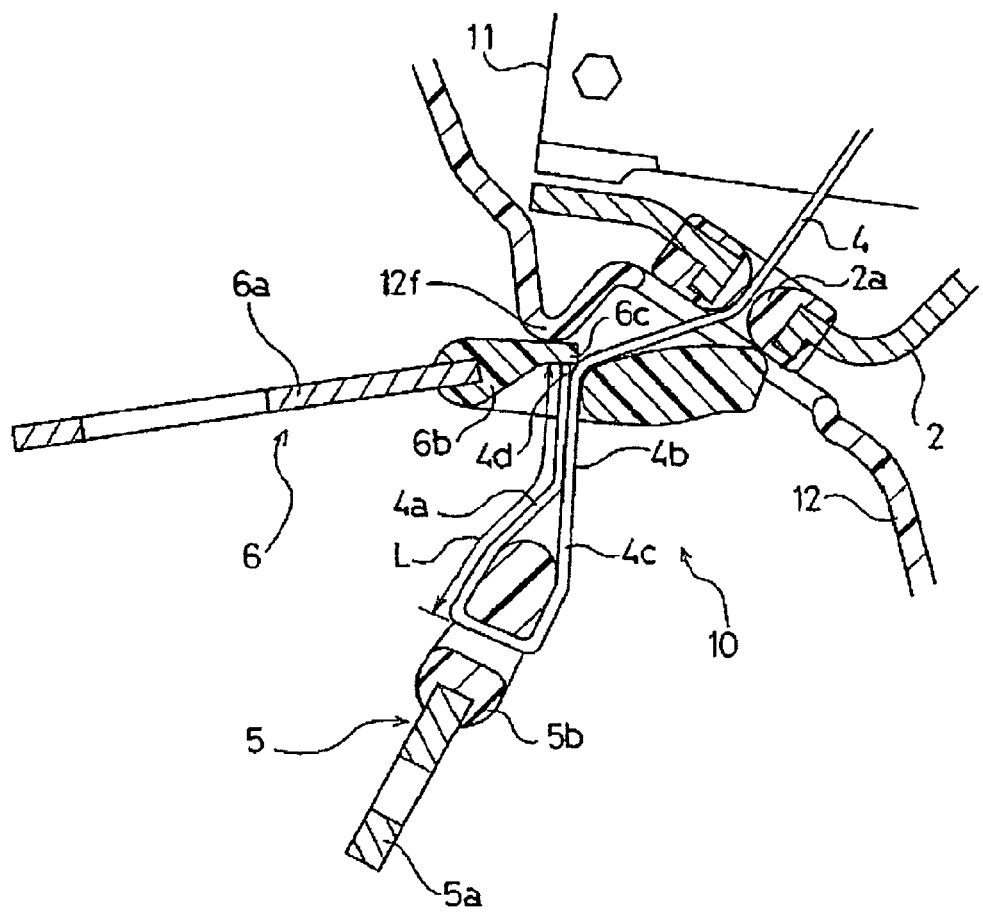

[FIG. 3]
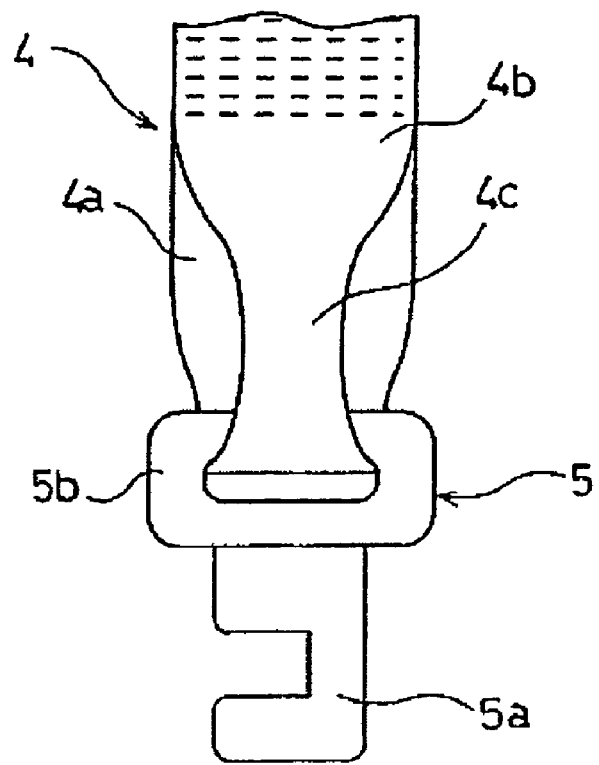

[FIG. 4]
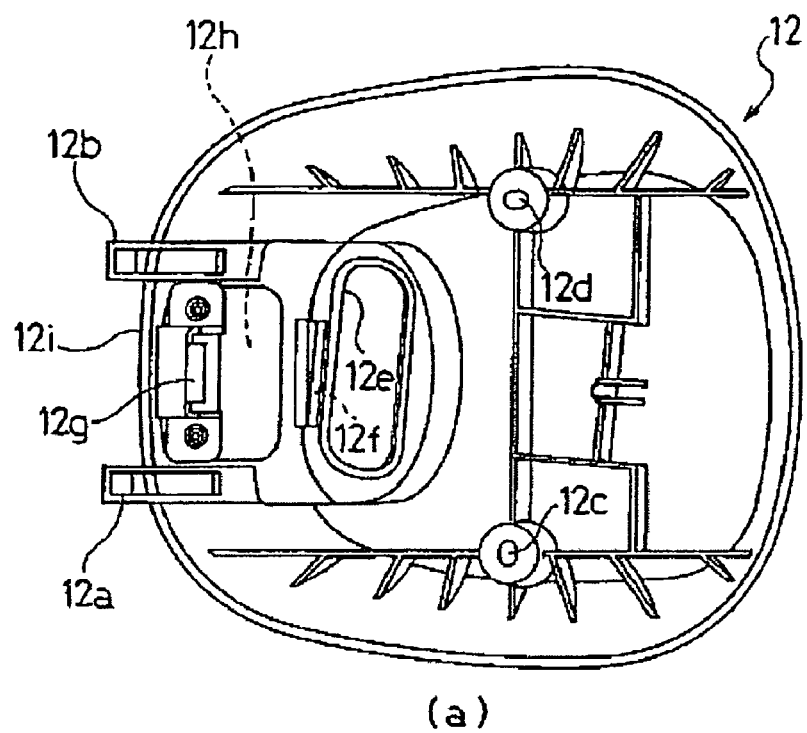
(a)
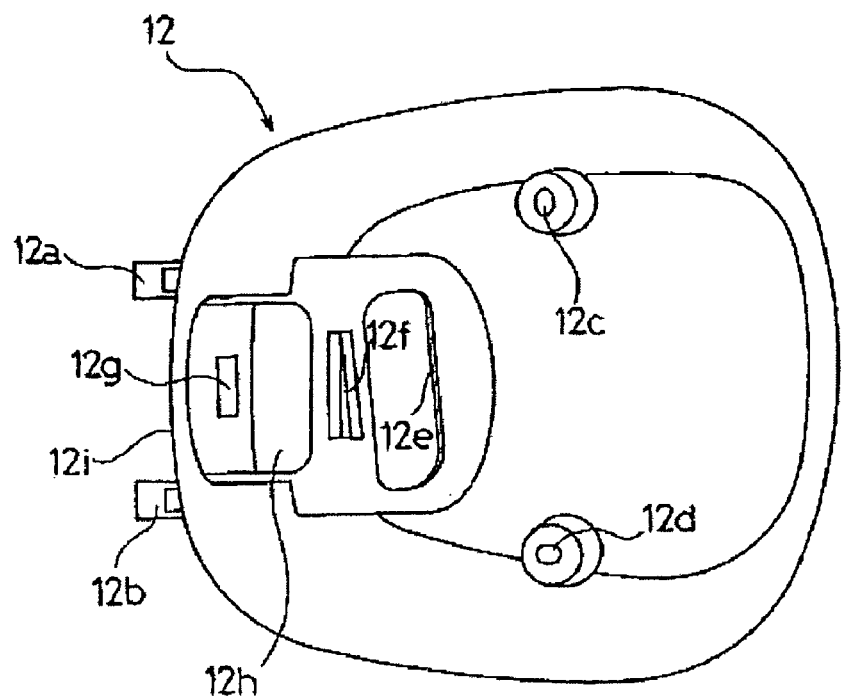
(b)

[FIG. 5]
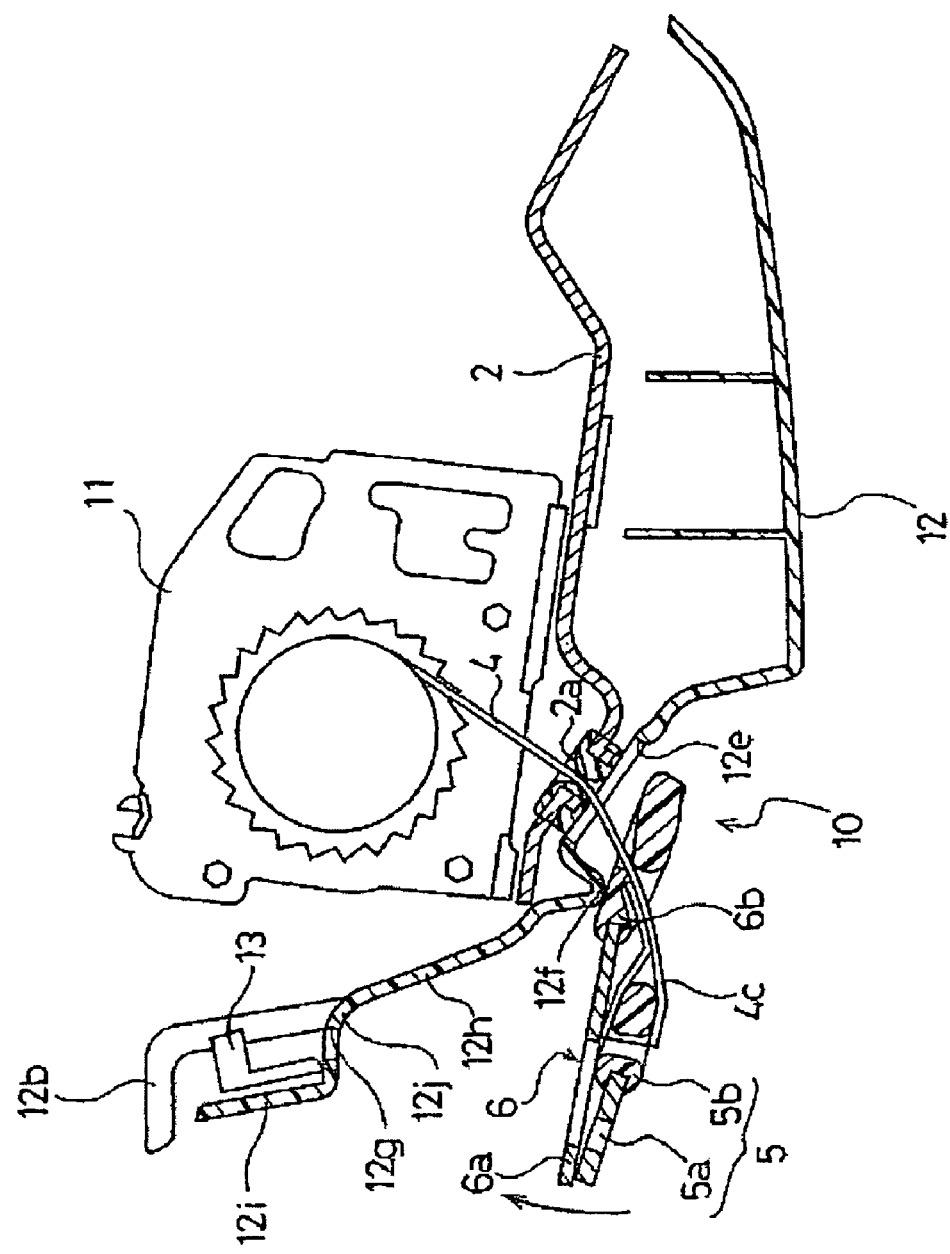

[FIG. 6]
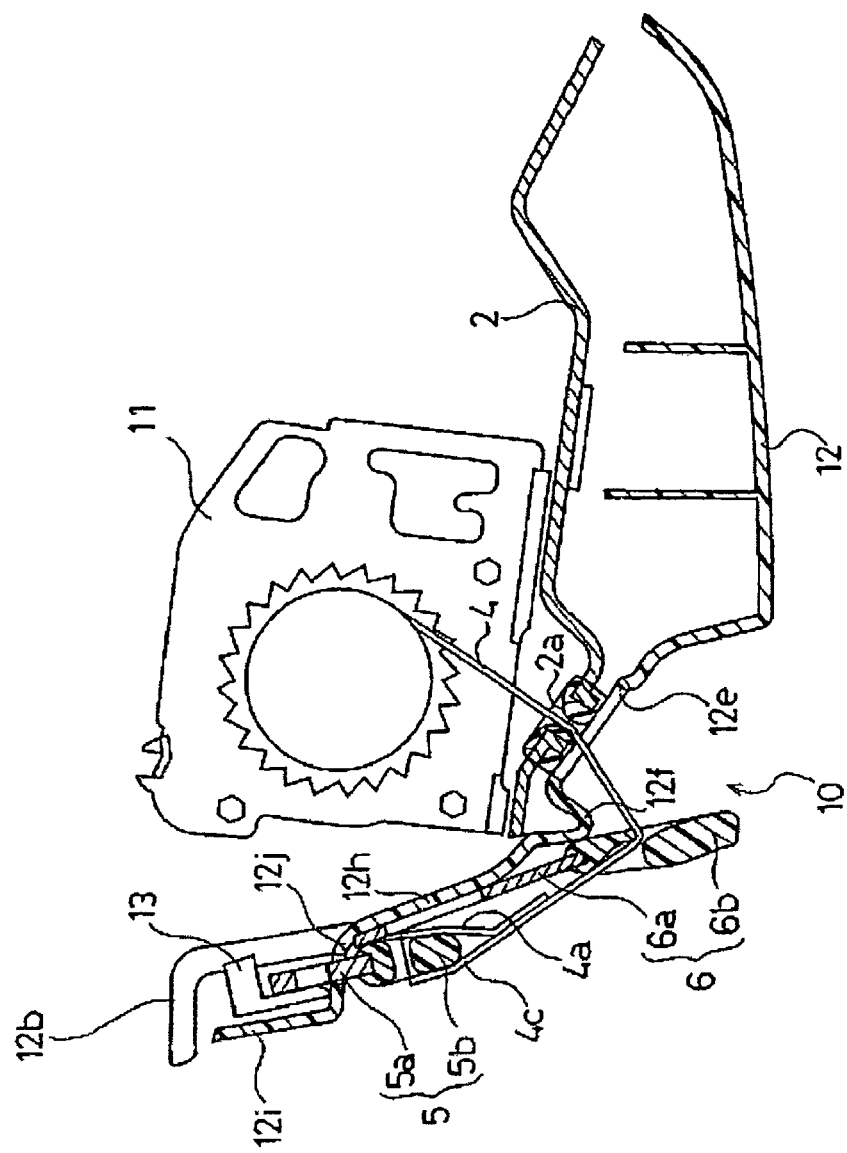

[FIG. 7]
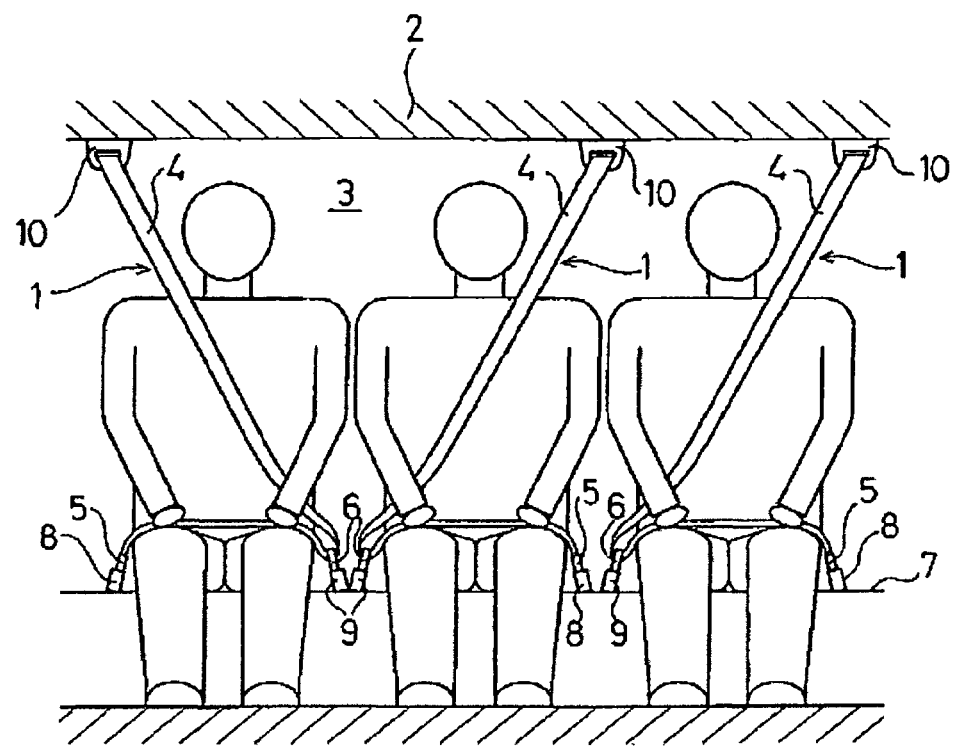

TONGUE STORAGE DEVICE AND SEAT BELT APPARATUS HAVING THE SAME

BACKGROUND ART

The present invention relates to a tongue storage device that stores a tongue supported by a seat belt, which is provided as an accessory on a vehicle seat such as, for example, a rear seat and restrains an occupant in an emergency, when the seat belt is not in use, the tongue engaging with a buckle on a side of a vehicle enabling an occupant to wear the seat belt, and to a seat belt apparatus having the same. More particularly, the present invention relates to a tongue storage device that stores both an anchor tongue and an occupant restraint tongue, and a seat belt apparatus having the same.

In general, seat belt apparatuses provided as an accessory in automobile seats are designed to restrain with seat belts occupants that are inertially moved in emergencies, in which a large vehicle deceleration occurs, such as in collisions or the like.

As such seat belt apparatuses, three-point-type seat belt apparatuses of various types have been developed. One known three-point-type seat belt apparatus is disposed in a rear seat and includes two tongues as shown in FIG. 7. A seat belt apparatus 1 includes: a seat belt retractor (not shown) disposed on a vehicle body, such as a roof portion 2, a pillar, or the like, so as to not be visible from a passenger compartment 3, the seat belt retractor being, for example, an emergency locking retractor (ELR), an automatic locking retractor (ALR), or the like; an anchor tongue 5 disposed at a leading end of a seat belt 4 withdrawn from the seat belt retractor; an occupant restraint tongue 6 slidably supported on the seat belt 4; an anchor buckle 8 which is disposed on a rear seat 7 and into which the anchor tongue 5 removably locks; an occupant restraint buckle 9 which is disposed on the rear seat 7 and into which the occupant restraint tongue 6 removably locks; and a tongue storage device 10 disposed at a position of the roof portion 2, from which the seat belt 4 withdrawn from the seat belt retractor is spooled out, the tongue storage device 10 for storing therein the anchor tongue 5 and the occupant restraint tongue 6 when the seat belt 4 is not being worn.

The tongue storage device 10 is to store, when, for example, only one or two persons sit in the rear seat 7 or a seat back of the rear seat 7 is folded down to use a space in a vehicle rear portion as a luggage compartment, the anchor tongue 5 and the occupant restraint tongue 6 in the roof portion 2 or the like so that the tongues 5, 6 do not cause an obstruction when the seat belt apparatus 1 is not in use. It is to be noted that the seat belt apparatus 1 disposed in left and right seats in the rear of the vehicle includes an arrangement, in which the position, from which the seat belt 4 withdrawn from the seat belt retractor is spooled out into the passenger compartment, is set at the pillar of the vehicle body and the tongue storage device 10 is disposed at the pillar.

As the tongue storage device 10, a tongue storage device has been proposed, in which an anchor tongue and an occupant restraint tongue are inserted in that order through an insertion port in the tongue storage device into a storage space, so that the tongues are partially stacked one on top of the other at mutually offset positions (see, for example, Japanese Unexamined Patent Application Publication No. 2002-331909).

According to the tongue storage device disclosed in Japanese Unexamined Patent Application Publication No. 2002-331909, the storage space can be made small in a thickness direction thereof, while at the same time, a head clearance can be sufficiently large.

In the above-described tongue storage device disclosed in Japanese Unexamined Patent Application Publication No. 2002-331909, however, the anchor tongue is first inserted through the insertion port into the storage space and then the occupant restraint tongue is inserted through the insertion port into the storage space. That is, two actions are required for storing the two tongues. This makes the storage operations of the two tongues cumbersome, posing a problem of poor storage operability of the two tongues.

In addition, the two tongues of the anchor tongue and the occupant restraint tongue are both elastically held using a spring member and a receiving member. This poses a problem in that it is difficult to hold the anchor tongue and the occupant restraint tongue in a stable manner. Moreover, an extra holding member is required for holding the occupant restraint tongue. This results in an increased number of parts required.

DISCLOSURE OF INVENTION

It is an object of the present invention to provide a tongue storage device allowing a storage operation of an anchor tongue and an occupant restraint tongue to be performed in a single action, thereby simplifying the storage operation of the two tongues and enhancing storage operability, and a seat belt apparatus using the same.

It is another object of the present invention to provide a tongue storage device capable of storing both the anchor tongue and the occupant restraint tongue in a stable manner and reducing the number of parts used, and a seat belt apparatus using the same.

To achieve the foregoing objects, the present invention provides a tongue storage device storing an anchor tongue attached to a seat belt for restraining an occupant and an occupant restraint tongue slidably supported on the seat belt. The tongue storage device is characterized as comprising tongue storage means that allows both the anchor tongue and the occupant restraint tongue to be stored by storing one of the anchor tongue and the occupant restraint tongue therein.

The tongue storage device according to another aspect of the present invention is characterized in that the tongue storage means includes tongue lock means, with which one of the anchor tongue and the occupant restraint tongue can engage.

The tongue storage device according to still another aspect of the present invention is characterized in that the tongue storage means stores, when storing one of the anchor tongue and the occupant restraint tongue, the other of the anchor tongue and the occupant restraint tongue by holding the same in place together with the seat belt.

The tongue storage device according to a further aspect of the present invention is characterized in that the other of the anchor tongue and the occupant restraint tongue is adapted to be rotated by a storage operation of the one of the anchor tongue and the occupant restraint tongue. Further, the tongue storage device is characterized in that the tongue storage means includes rotation pivot means forming a pivot of rotation when the other of the anchor tongue and the occupant restraint tongue is rotated.

A seat belt apparatus according to an aspect of the present invention comprises at least: a seat belt restraining an occupant; a seat belt retractor retracting the seat belt; an anchor tongue attached to the seat belt; an anchor buckle which is disposed on a vehicle body and with which the anchor tongue is engageable; an occupant restraint tongue slidably supported on the seat belt; an occupant restraint buckle which is disposed on the vehicle body and with which the occupant restraint tongue is engageable; and a tongue storage device storing the anchor tongue and the occupant restraint tongue.

The seat belt apparatus is characterized in that the tongue storage device is the tongue storage device according to the foregoing aspects of the present invention.

The seat belt apparatus according to the aspect of the present invention is further characterized in that the tongue storage device is disposed on the vehicle body, such as a roof portion of the vehicle or the like.

In the tongue storage device as configured above according to the aspects of the present invention, the tongue storage means stores both the anchor tongue and the occupant restraint tongue by storing either one of the anchor tongue and the occupant restraint tongue. This allows both the anchor tongue and the occupant restraint tongue to be stored in the single action operation for storing either one of the anchor tongue and the occupant restraint tongue. Accordingly, a storage operation for the two tongues of the anchor tongue and the occupant restraint tongue can be simplified and the storage operability of the two tongues can be enhanced.

According to the tongue storage device according to the aspects of the present invention, by engaging the tongue lock means with one of the anchor tongue and the occupant restraint tongue, the one of the anchor tongue and the occupant restraint tongue can be stored in a stable manner. Moreover, this allows the other of the anchor tongue and the occupant restraint tongue to be stored in a stable manner.

In the tongue storage device according to the aspects of the present invention, the other of the anchor tongue and the occupant restraint tongue is held in place during storage by the seat belt. This eliminates the need for any extra holding member for holding the other tongue, which leads to a reduced number of parts used.

In the tongue storage device according to the aspects of the present invention, the storage operation for one of the anchor tongue and the occupant restraint tongue causes the other of the anchor tongue and the occupant restraint tongue to be rotated about the rotation pivot means. This allows the other tongue to be rotated and stored smoothly and in a stabilized manner. Consequently, the single action operation for storing the one of the anchor tongue and the occupant restraint tongue allows the two tongues of the anchor tongue and the occupant restraint tongue to be stored even more easily and smoothly.

In the seat belt apparatus according to the aspect of the present invention, wearability of the seat belt can be improved by providing the tongue storage device having the anchor tongue and the occupant restraint tongue.

BRIEF DESCRIPTION OF THE DRAWINGS

FIG. 1 is a view showing an example of a tongue storage device according to an embodiment of the present invention.

FIG. 2 is a partial enlarged view of FIG. 1.

FIG. 3 is a view showing a portion, at which an anchor tongue is attached to a seat belt.

FIGS. 4(a) and 4(b) are views showing a cover main body, FIG. 4(a) being a bottom view and FIG. 4(b) being a top view.

FIG. 5 is a view showing a midway condition of a storage operation for the anchor tongue and an occupant restraint tongue.

FIG. 6 is a view showing a condition, in which the anchor tongue and the occupant restraint tongue are stored.

FIG. 7 is a view showing a conventional three-point-type seat belt apparatus in a rear seat.

BEST MODE FOR CARRYING OUT THE INVENTION

The best mode for carrying out the present invention will be described below with reference to the accompanying drawings.

FIG. 1 is a view showing an example of a tongue storage device according to an embodiment of the present invention. FIG. 2 is a partially enlarged view of FIG. 1. Like reference numerals as those used in the above-described prior art arrangements refer to like parts and repeated descriptions are omitted.

A seat belt apparatus 1 according to the embodiment of the present invention is a three-point-type seat belt apparatus 1 disposed in the rear seat 7 shown in FIG. 7 and having a tongue storage device 10 according to the embodiment of the present invention.

Referring to FIGS. 1 and 2, the seat belt apparatus 1 of the example includes a seat belt retractor 11 of the conventional well-known ELR or ALR type. The seat belt retractor 11 is disposed at a roof portion 2 on a side opposite a passenger compartment 3 and not visible from the passenger compartment 3. A seat belt 4 withdrawn from the seat belt retractor 11 is fed off into the passenger compartment 3 through an opening 2a in the roof portion 2. In FIGS. 1 and 2, the crosswise direction corresponds to a fore-aft direction of a vehicle. The direction is not, however, limited to the fore-aft direction of the vehicle; rather, the crosswise direction in FIG. 1 may be the fore-aft direction of the vehicle, or a crosswise direction of the vehicle. For convenience of explanation, the example will be described on the basis that the crosswise direction in FIG. 1 is the fore-aft direction of the vehicle. Understandably, the fore-aft direction of the vehicle in the descriptions that follow varies as the crosswise direction of FIG. 1 is either referred to as the fore-aft direction or the crosswise direction of the vehicle.

In the same manner as in the prior art apparatus, the seat belt 4 has a leading end folded back to form a fold back portion 4a. Part of the fold back portion 4a is rigidly joined to a non-fold back portion 4b of the seat belt 4 through sewing, so that a loop is formed. An anchor tongue 5 is attached to and supported by this loop. In this case, the fold back portion 4a is disposed toward the front of the vehicle relative to the non-fold back portion 4b. Referring to FIG. 3, the non-fold back portion 4b of the loop includes a pickup portion 4c formed therein. The pickup portion 4c is formed by narrowing the seat belt 4 in the width direction thereof. A storage operation for the anchor tongue 5 is performed, as will be described later, by picking up the pickup portion 4c with fingers.

In the same manner as in the prior art apparatus, an occupant restraint tongue 6 is slidably supported on the seat belt 4. In this case, the occupant restraint tongue 6 has a belt insertion hole 6c having a size set such that a relative movement between the occupant restraint tongue 6 and the seat belt 4 is brought to a stop when a leading end 4d of the fold back portion 4a of the seat belt 4 abuts on an edge of the belt insertion hole 6c in a grip portion 6b. The fold back portion 4a of the seat belt 4 has a length L (shown in FIG. 2) that is set to a predetermined length such that a distance between the anchor tongue 5 and the occupant restraint tongue 6 remains a constant distance even when the occupant restraint tongue 6 moves in a direction toward the anchor tongue 5. The predetermined length of the fold back portion 4a is set such that the anchor tongue 5 can abut on a lock tab 6a of the occupant restraint tongue 6 when the anchor tongue 5 is rotated in a clockwise direction in FIG. 1. Further, the lock tab 6a of the occupant restraint tongue 6 is adapted to be disposed on a front side of the vehicle relative to the seat belt 4.

The tongue storage device 10 of this example is disposed on a side of the passenger compartment 3 of the roof portion 2 so as to cover the opening 2a. The tongue storage device 10 includes: a cover main body 12 removably mountable on the roof portion 2; and tongue lock-and-hold means 13 disposed on a side of the cover main body 12 opposite the passenger compartment 3, the tongue lock-and-hold means 13 for holding the anchor tongue 5 by elastically locking a lock tab 5a of the anchor tongue 5 with, for example, a spring tension or the like of a spring.

Referring to FIGS. 4(*a*) and 4(*b*), the cover main body 12 is molded from a synthetic resin material. The cover main body 12 includes: a pair of support lock tabs 12a, 12b locked to the roof portion 2 for supporting this portion onto the roof portion 2; a pair of screw insertion holes 12c, 12d disposed at a center portion of the cover main body 12, through which screws threadedly engaging the roof portion 2 are passed; a belt through hole 12e disposed at an intermediate portion in the vehicle fore-aft direction between the pair of support lock tabs 12a, 12b and the pair of screw insertion holes 12c, 12d, through which the seat belt 4 is movably passed in a longitudinal direction thereof; a pivot rib 12f (which corresponds to the rotation pivot means according to an aspect of the present invention) provided in a standing condition adjoining the belt through hole 12e so as to protrude toward the side of the passenger compartment 3 and extending in a longitudinal direction of the belt through hole 12e (specifically, the width direction of the seat belt 4); a tongue insertion hole 12g disposed at a position between the pair of support lock tabs 12a, 12b at a vehicle front portion of the cover main body 12, through which the lock tab 5a of the anchor tongue 5 is passed; a tongue support portion 12h disposed between the pivot rib 12f and the tongue insertion hole 12g, on which the lock tab 6a of the occupant restraint tongue 6 can abut in surface-to-surface contact; and a hold means mounting portion 12i disposed adjoining the tongue insertion hole 12g, on which the tongue lock-and-hold means 13 is mounted.

Specifically, an edge of the opening 2a in the roof portion 2, the seat belt 4, the seat belt retractor 11, the pivot rib 12f, the tongue support portion 12h, and the tongue lock-and-hold means 13 form the tongue storage means according to the aspects of the present invention.

Referring to FIG. 1, the pivot rib 12f is formed into a tapered shape having a broad base and a tapered end. The pivot rib 12f also has a round end. This helps make it easier to extract molds during molding of the cover main body 12. Rotation of the occupant restraint tongue 6 made with the pivot rib 12f as a pivot of rotation can also be made smoothly, as will be described later.

The grip portion 6b of the occupant restraint tongue 6 is adapted to abut onto the pivot rib 12f. The occupant restraint tongue 6 is adapted to be rotated clockwise with the pivot rib 12f as the pivot of rotation from a state shown in FIG. 1, in which the grip portion 6b abuts against the pivot rib 12f. The tongue support portion 12h is adapted to support the lock tab 6a of the occupant restraint tongue 6 when the lock tab 6a abuts on the tongue support portion 12h in surface-to-surface contact. It should be noted that the abutment of the lock tab 6a on the tongue support portion 12h is not limited to the surface-to-surface contact; rather, the abutment may be a line contact or a point contact.

Referring to FIG. 1, in a state in which the cover main body 12 is mounted on the roof portion 2, the belt through hole 12e opposes the opening 2a in the roof portion 2. Further, the tongue insertion hole 12g and the tongue lock-and-hold means 13 are disposed on the vehicle front side.

An operation will be described below, in which the anchor tongue 5 and the occupant restraint tongue 6, after wearing of the seat belt 4 has been completed, are to be stored in the tongue storage device 10 of this example as configured as described heretofore.

An occupant sitting in the rear seat completes wearing of the seat belt 4. The occupant then removes the occupant restraint tongue 6 from an occupant restraint buckle 9 and removes the anchor tongue 5 from an anchor buckle 8. This causes the seat belt 4, which has been withdrawn, to be retracted by the seat belt retractor 11. As a result, the anchor tongue 5 is raised. The occupant restraint tongue 6 is also raised up as the seat belt 4 is retracted. At this time, however, the occupant restraint tongue 6 is raised in a position so as to slightly obliquely cross the seat belt 4 with the lock tab 6a thereof oriented downward and the grip portion 6b oriented upward.

The raising of the occupant restraint tongue 6 occurring as a result of the seat belt 4 being retracted brings an end edge of the grip portion 6b of the occupant restraint tongue 6 opposite to the lock tab 6a into abutment with the edge of the opening 2a in the roof portion 2. As the seat belt 4 is retracted further, the leading end 4d of the fold back portion 4a of the seat belt 4 abuts on the edge of the belt insertion hole 6c in the occupant restraint tongue 6. This brings the relative movement between the occupant restraint tongue 6 and the seat belt 4 to a stop. The retraction force of the seat belt 4 then rotates the occupant restraint tongue 6 clockwise about a portion thereof in abutment with the edge of the opening 2a in the roof portion 2. When the grip portion 6b of the occupant restraint tongue 6 then abuts on the pivot rib 12f, the rotation of the occupant restraint tongue 6 is stopped, bringing the components into positions shown in FIGS. 1 and 2. At this time, the lock tab 6a of the occupant restraint tongue 6 faces the vehicle front side, specifically, the side of the tongue insertion hole 12g. In addition, the length L of the fold back portion 4a of the seat belt 4 is set to a predetermined length. This maintains a predetermined distance between the anchor tongue 5 and the occupant restraint tongue 6.

The pickup portion 4c adjoining the anchor tongue 5 is then picked up with fingers and rotated clockwise from the condition shown in FIG. 1. Then, referring to FIG. 5, the anchor tongue 5 abuts on the occupant restraint tongue 6 and, at the same time, the occupant restraint tongue 6 is rotated clockwise with the anchor tongue 5. At this time, the occupant restraint tongue 6 is rotated clockwise with the pivot rib 12f as a pivot.

When the occupant restraint tongue 6 is rotated clockwise by a predetermined amount, the lock tab 6a of the occupant restraint tongue 6 abuts on the tongue support portion 12h of the cover main body 12 in surface-to-surface contact as shown in FIG. 6. This prevents the occupant restraint tongue 6 from rotating, which also prevents the anchor tongue 5 from rotating. In a state, in which both the anchor tongue 5 and the occupant restraint tongue 6 are prevented from rotating, a leading end of the lock tab 5a of the anchor tongue 5 opposes the tongue insertion hole 12g.

Then, the lock tab 5a of the anchor tongue 5 is inserted, with the lock tab 6a kept in abutment with the tongue support portion 12h, into the tongue insertion hole 12g to be locked in the tongue lock-and-hold means 13. In this state, a leading end of the lock tab 6a of the occupant restraint tongue 6 is clamped between a grip portion 5b of the anchor tongue 5 and the tongue support portion 12h and held by an elastic force of the tongue support portion 12h. Further, the grip portion 6b of the occupant restraint tongue 6 is clamped between the seat belt 4 and the pivot rib 12f and held by the retraction force of the seat belt retractor 11 applied to the seat belt 4. At this time, the lock tab 6a of the occupant restraint tongue 6 abuts on a folded portion 12j between a portion at which the tongue insertion hole 12g is formed in the cover main body 12 and the tongue support portion 12h. This prevents the occupant restraint tongue 6 from moving along a surface of the tongue support portion 12h. As such, the anchor tongue 5 and the occupant restraint tongue 6 can both be stored through a single action operation by simply locking the anchor tongue 5 in the tongue lock-and-hold means 13.

To use the seat belt apparatus 1 in the state shown in FIG. 6 in which both the anchor tongue 5 and the occupant restraint tongue 6 are stored, the occupant picks up the pickup portion 4c near the anchor tongue 5 with his or her fingers and pulls the anchor tongue 5 with a predetermined force. Being simply locked by an elastic force of the tongue lock-and-hold means 13, the anchor tongue 5 can then be pulled out of the tongue lock-and-hold means 13 relatively easily. The occupant then locks the anchor tongue 5 in the anchor buckle 8 and next sits in the rear seat 7. When the occupant restraint tongue 6 is thereafter locked in the occupant restraint buckle 9, the seat belt 4 can be worn by the occupant. It should be noted that the anchor tongue 5 can be locked in the anchor buckle 8 by an occupant who has already been seated in the rear seat 7.

According to the tongue storage device 10 of this example, the lock tab 5a of the anchor tongue 5 is stored by being locked and held by the tongue lock-and-hold means 13. This allows the occupant restraint tongue 6 to be stored by being clamped between the anchor tongue 5 and the tongue support portion 12h of the cover main body 12, and between the seat belt 4 and the pivot rib 12f. Accordingly, the anchor tongue 5 and the occupant restraint tongue 6 can both be stored through the single action operation for storing the anchor tongue 5. The storage operation for the two tongues of the anchor tongue 5 and the occupant restraint tongue 6 can thereby be simplified and storage operability of the two tongues can be enhanced.

Only the anchor tongue 5 is locked and held by the tongue lock-and-hold means 13. This allows the anchor tongue 5 to be stored in a stabilized manner. In addition, the occupant restraint tongue 6 is held by the anchor tongue 5, which is stored in a stabilized manner, and the seat belt 4. This allows the occupant restraint tongue 6 to be again stored in a stabilized manner.

When the occupant restraint tongue 6 is held by the seat belt 4, the occupant restraint tongue 6 is held with no play therein by the belt retraction force of the seat belt retractor 11. This suppresses noise that would otherwise occur from play in the tongue in the storage position.

Holding the occupant restraint tongue 6 with the seat belt 4 eliminates the need for any extra holding member for holding the occupant restraint tongue 6, which leads to a reduced number of parts used.

The occupant restraint tongue 6 is rotated with the pivot rib 12f of the cover main body 12 as the pivot. This allows the occupant restraint tongue 6 to be rotated smoothly and in a stabilized manner. This makes it possible to store the two tongues of the anchor tongue 5 and the occupant restraint tongue 6 even more easily and smoothly through the single action operation for storing the anchor tongue 5.

Further, in accordance with the seat belt apparatus 1 of this example, the tongue storage device 10 of this example having the anchor tongue 5 and the occupant restraint tongue 6 is provided. This improves wearability of the seat belt 4 even further.

In the above-described example, the size of the belt insertion hole 6c in the occupant restraint tongue 6 may alternatively be set such that the fold back portion 4a of the seat belt 4 can penetrate through the belt insertion hole 6c in the grip portion 6b. In this case, the length L of the fold back portion 4a of the seat belt 4 does not necessarily have to be set to the predetermined length; rather, the length L may be of any length. In addition, in this case, the loop of the seat belt 4 for supporting the anchor tongue 5 abuts on the occupant restraint tongue 6 when the seat belt 4 is retracted after the belt is no longer worn.

The tongue storage device 10 according to the aspects of the present invention is not limited to the above-described example. The aspects of the present invention can be applied to the tongue storage device 10 of any arrangement, as long as the arrangement allows both the anchor tongue 5 and the occupant restraint tongue 6 to be stored through the single action operation for storing at least either one of these two tongues.

Further, in the example as described above, the anchor buckle 8 and the occupant restraint buckle 9 are disposed at the rear seat 7. This is not, however, the only possible arrangement; rather, at least either one of the anchor buckle 8 and the occupant restraint buckle 9 may be disposed on the vehicle body, such as on a vehicle body floor or the like.

INDUSTRIAL APPLICABILITY

The tongue storage device and the seat belt apparatus having the same according to the aspects of the present invention can be applied to a tongue storage device that stores a tongue supported by a seat belt, which is provided as an accessory on a vehicle seat such as, for example, a rear seat and restrains an occupant in an emergency, and engaging with a buckle on a side of a vehicle for an occupant to wear the seat belt, and to a seat belt apparatus having the same. In particular, the tongue storage device and the seat belt apparatus having the same according to the aspects of the present invention can be preferably used in a tongue storage device that stores both an anchor tongue and an occupant restraint tongue, and a seat belt apparatus having the same.

What is claimed is:

1. A tongue storage device for a seat belt of a vehicle, comprising:
   a first tongue adapted to be fixed to the seat belt,
   a second tongue adapted to be slidably attached to the seat belt, and
   a cover main body adapted to be attached to a roof portion of the vehicle, said cover main body including a belt through hole through which the seat belt passes, a pivot rib located adjacent to one side of the belt through hole, a tongue support portion extending upwardly from the pivot rib at a side opposite to the belt through hole, and a tongue insertion hole situated adjacent to the tongue support portion at a side opposite to the pivot rib and facing downwardly in a direction to the pivot rib, said tongue insertion hole receiving only the first tongue so that when the first tongue is inserted into the tongue insertion hole, the second tongue pivots at the pivot rib and is held between the first tongue and the tongue support portion in a substantially upwardly inclined state.

2. The tongue storage device according to claim 1, further comprising a tongue holding device situated inside the cover main body to face the tongue insertion hole so that the first tongue engages the tongue holding device.

3. The tongue storage device according to claim 2, wherein said first and second tongues are disposed outside the cover main body and the first tongue directly faces an inside of the vehicle.

4. The tongue storage device according to claim 3, wherein the first tongue is smaller than the second tongue.

5. The tongue storage device according to claim 1, wherein the first tongue is an anchor tongue, and the second tongue is an occupant restraint tongue.

6. A seat belt apparatus comprising:

the storage device according to claim 1, the seat belt attached to the first and second tongues, and a seat belt retractor for withdrawing and retracting the seat belt, said seat belt retractor being disposed immediately above the storage device.

* * * * *